United States Patent [19]

Koga

[11] Patent Number: 4,477,513
[45] Date of Patent: Oct. 16, 1984

[54] LAMINATE
[75] Inventor: Hitoshi Koga, Iwakuni, Japan
[73] Assignee: Mitsui Petrochemical Industries, Ltd., Tokyo, Japan
[21] Appl. No.: 151,833
[22] Filed: May 21, 1980
[30] Foreign Application Priority Data May 28, 1979 [JP] Japan ............................. 54-70664[U]

[51] Int. Cl.³ .............................................. B32B 7/00
[52] U.S. Cl. .................................... 428/246; 156/289;
428/285; 428/294; 428/286; 428/458; 428/461;
428/287
[58] Field of Search .............. 428/458, 461, 432, 392,
428/285–287, 246, 294; 156/289

[56] References Cited

U.S. PATENT DOCUMENTS

| 3,801,416 | 4/1974 | Gulbietz ............................. 428/911 |
| 4,029,838 | 6/1977 | Chamis ............................... 428/911 |
| 4,087,300 | 5/1978 | Adler .................................. 156/184 |
| 4,234,653 | 11/1980 | Ballard et al. ..................... 428/432 |
| 4,369,222 | 1/1983 | Hedrick et al. ..................... 428/458 |

FOREIGN PATENT DOCUMENTS

| 991523 | 6/1976 | Canada ............................... 428/461 |
| 1001734 | 3/1964 | United Kingdom . |
| 1397955 | 6/1975 | United Kingdom ............... 428/911 |
| 2038239 | 7/1980 | United Kingdom ............... 428/461 |

Primary Examiner—William R. Dixon, Jr.
Assistant Examiner—E. Rollins Buffalow
Attorney, Agent, or Firm—Wyatt, Gerber, Shoup, Scubey and Badie

[57] ABSTRACT

A laminate comprises a sandwich plate of metal-thermoplastic resin-metal layers and a fiber reinforced plastics overlying at least one surface of the sandwich plate. The laminate is suitable for outer wall plates of various matters.

6 Claims, 3 Drawing Figures

LAMINATE

BACKGROUND OF THE INVENTION

1. Field of the Invention

This invention relates to a laminate and more particularly, to a laminate suitable for outer wall plates of various, small or large, structures.

2. Description of the Prior Art

It has been recently contemplated to make the weight of freight car, container, motorcar and the like lighter, but as far as a metal is used, the weight can not be made so light, and moreover, some countermeasure to corrosion is required.

Where a high rigidity is required, fiber reinforced plastics (FRP) has been tested, but the specific gravity is so large that the weight can not be lessened so much. In addition, FRP is of less dimension stability upon shaping and such less dimension stability causes troubles upon assembly the FRP members because the members does not fit so well. Furthermore, when glass fiber reinforced plastics are used, the energy absorption capacity is not so high that the structure is fragile and is broken when subjected to impact. Crack is liable to be formed and a hole is formed. Moreover, FRP is easily burned. For example, when an iron block of an elevated temperature contacts FRP, the contacted portion is oxidized and deteriorated (burned) to form a through-hole there.

SUMMARY OF THE INVENTION

An object of the present invention is to provide a laminate having excellent fireproof property, thermally insulating property, rigidity and the like as well as light weight.

According to the present invention, there is provided a laminate which comprises a sandwich plate composed of two outer layers of a metal and an inner layer of a thermoplastic resin sandwiched in between the outer layers and at least one surface of the sandwich plate having a fiber reinforced plastics layer laminated thereon.

DESCRIPTION OF THE PREFERRED EMBODIMENTS

Figure 1:
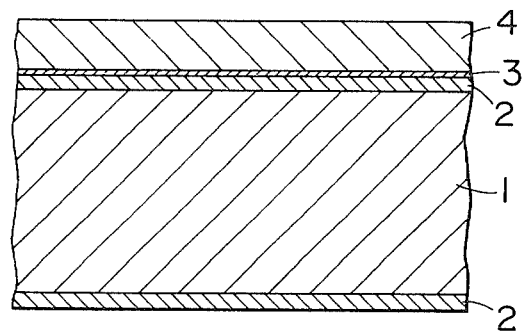
FIGS. 1-3 show schematical cross sectional views of embodiments of the present invention.

Referring to FIG. 1, an inner layer 1 is composed of a thermoplastic resin. As the thermoplastic resin, there may be mentioned polyolefins, polystyrenes, polyamides and the like. More particularly, there are exemplified middle or low density polyethylene, ethylene-vinyl acetate copolymers, high density polyethylene, and polypropylene. If desired, two or more of the thermoplastic resins may be used in combination. Polyolefin may be used in combination with a synthetic rubber such as polybutadiene, polyisobutylene, chloroprene rubber, ethylene-propylene rubber, ethylene propylene terpolymer and the like, or other soft resin.

It is desirable to graft-copolymerize a part of whole of the polyolefin with an unsaturated carboxylic acid or anhydride thereof such as acrylic acid, maleic anhydride and the like because such graft copolymerization serves to increase the adhesion between the polyolefin and the metal outer layer.

An example of polyamide is nylon.

To the thermoplastic resin, if desired, there may be added a stabilizer, a filler such as carbon black, mica, magnesium hydroxide and the like. The inner layer may be in a form of non-woven cloth, mat, foamed material as well as an ordinary sheet.

The both outer layers 2 are composed of a thin metal sheet. As the metal, there may be used aluminum, iron, copper, zinc and the like. Examples of iron are stainless steel, zinc-coated iron, tin-coated iron, tin-free iron, and the like. Further, a clad metal may be also used.

The two metal layers may be composed of the same metal. or different metals.

The inner layer 1 and the outer layers 2 may be integrated by a know integrating method such as, for example, heat pressing and the like. Examples of known integrating methods are surface treatment, adhesive coating, insertion of an adhesive film and the like.

As the adhesive or adhesive film, a material containing the above mentioned copolymer modified by an unsaturated carboxylic acid and the like is preferably used because the adhesion between the inner layer and the outer layer is strengthened.

Thickness of the sandwich plate is usually 1-10 mm, preferably 1.5-4 mm.

The layer 4 composed of fiber reinforced plastics may be composed of filament winding in one direction or in crossed directions, glass cloth, roving cloth, glass mat, carbon fibers and the like. These materials may be used as only one layer or as superposed two or more layers. As matrix, there may be used unsaturated polyester resins, epoxy resins and the like.

The resins may contain various fillers, if desired. It is preferable to change the density of the fiber in the thickness direction in the FRP layer. In particular, it is preferable that a layer having a higher content of a matrix resin is disposed at the side contacting the metal layer of the sandwich plate in the fiber reinforced resin layer. Thickness of the FRP layer is usually 0.5-5 mm, preferably 0.8-3 mm.

The metal outer layer and the FRP layer may be integrated upon shaping the resin by the adhesion force of the resin. However, it is preferable that, as shown in FIG. 1, a layer 3 composed of a metal surface treated layer, acrylic series binder, urethane series binder, epoxy series binder and the like is disposed between the FRP layer 4 and the metal outer layer 2 so as to enhance the adhesion. Among them, an urethane series binder is more preferable.

The laminate of the present invention is, if desired, subjected to a secondary working. For example, the sandwich plate is preliminarily subjected to a secondary working such as bending, drawing and the like and then an FRP layer is superposed thereon.

Figure 2:
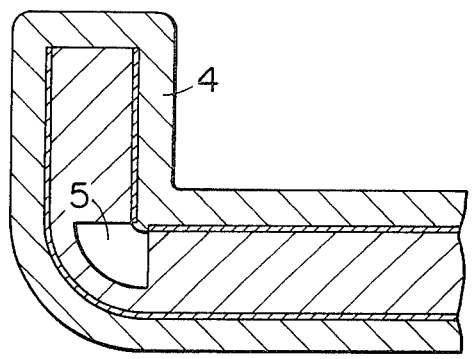

FIG. 2 shows a laminate preliminarily subjected to a bending working before superposing an FRP layer 4. A cut portion 5 is present in the inner layer of the sandwich plate.

Figure 3:
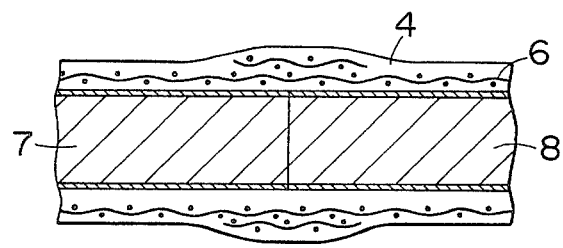

In FIG. 3, the ends of the sandwich plates 7, 8 are butted against each other and connected by adhering an FRP layer 4 containing glass cloth 6 to both sides of the sandwich plates.

The laminate according to the present invention is highly fireproof, thermally insulative, rigid and of a light weight. Therefore, the laminate can be used as outer wall plates of various articles, structures and constructions, for example, outer wall plates for various vehicles such as freight cars, containers, motorcars and the like, and other structures such as tanks, electric apparatuses and the like.

Since the laminate of the present invention employs a sandwich plate having a thermoplastic resin inner layer, the sandwich plate can be used as a mold when the FRP layer is superposed on the sandwich plate. Therefore, a final product can be directly produced by laminating the FRP layer to the sandwich plate as a mold. As the result, the fabricating steps can be reduced to a great extent.

When a large impact is applied to a plate composed of FRP alone, many cracks are formed in the plate and the plate is destroyed. However, the laminate of the present invention is composed of an FRP layer bonded to a sandwich plate containing an inner layer of a thermoplastic resin which can absorb the applied impact, and therefore, the laminate is not broken into pieces and the FRP layer is only slightly damaged such that only a recess is formed.

In addition, the laminate of the present invention can be worked by cold working such as bending by a bending roll or other plastic working while the conventional plates composed of an FRP alone necessitate a mold. Thus, the steps are reduced to a great extent, and further, the weight of the laminate of the present invention is far lighter than conventional one.

EXAMPLE

Onto both sides of a sandwich plate composed of two aluminum outer layers, each layer being 200 microns thick, and one inner layer composed of a high density polyethylene of 2.6 mm thick was laminated a glass fiber reinforced plastic layer (1.5 mm thick) composed of one layer of a glass mat, one layer of a glass cloth, the total amount of glass being 30% based on the layer, and an unsaturated polyester as a matrix. The lamination of the glass fiber reinforced plastic layer was carried out by applying a urethane series adhesive two-liquid type to the surface of the aluminum outer layer of the sandwich plate by spraying, drying at room temperature, coating the unsaturated polyester on the surface, placing the glass mat, applying the unsaturated polyester to impregnate the glass mat with the unsaturated polyester, removing foams by means of a roller, placing the glass cloth thereon, applying the unsaturated polyester to impregnate the glass cloth with the unsaturated polyester, removing foams by means of a roller, and curing at room temperature.

The laminate was subjected to a bending working of a radius of 3000 mm by using a three-roll bender. The FRP layer of the laminate thus bended is free from any defect such as crack and the like.

The bended laminate may be used as a side plate of a tank.

COMPARISON EXAMPLE

A glass fiber reinforced unsaturated polyester resin plate comprising 2 layers of glass mat and 2 layers of glass cloth and the glass weight being 30% based on the plate was prepared and subjected to the same bending working by using a three-roll bender as in Example above, but the plate was not bended, and when the bending load was increased, the plate was broken.

I claim:

1. A rigid laminate which comprises a sandwich plate composed of two outer layers of a metal and an inner layer of a thermoplastic resin sandwiched in between the outer layers, at least one exterior surface of the sandwich plate having a fiber reinforced organic resin layer laminated thereon, said fiber being in the form of a filament winding 2. A laminate according to claim 1 in which the thermoplastic resin is polyethylene.

3. A laminate according to claim 1 in which the thermoplastic resin is polypropylene.

4. A laminate according to claim 1 in which the thermoplastic resin is polyamide.

5. A laminate according to claim 2, 3 or 4 in which the metal is aluminum.

6. A laminate according to claim 2, 3 or 4 in which the metal is iron.

* * * * *